United States Patent [19]

Gerardi

[11] Patent Number: 5,117,687

[45] Date of Patent: Jun. 2, 1992

[54] OMNIDIRECTIONAL AERODYNAMIC SENSOR

[76] Inventor: Joseph J. Gerardi, 81 Crystal Dr., Dryden, N.Y. 13053

[21] Appl. No.: 463,042

[22] Filed: Jan. 11, 1990

[51] Int. Cl.⁵ .......................... G01W 1/02; G01P 5/02; G01C 23/00
[52] U.S. Cl. .................................. 73/170 R; 73/180; 73/186; 73/189
[58] Field of Search ...................... 73/170 R, 180, 186, 73/189, 862.04

[56] References Cited

U.S. PATENT DOCUMENTS

| | | |
|---|---|---|
| 2,440,198 | 4/1948 | Green . |
| 2,543,020 | 2/1951 | Hess ...................................... 73/189 |
| 2,789,281 | 4/1957 | Short et al. . |
| 2,800,647 | 7/1957 | Baerwald et al. . |
| 3,240,054 | 3/1966 | Roth . |
| 3,362,663 | 1/1968 | Wehrmann . |
| 3,383,914 | 5/1968 | MacArthur . |
| 3,915,015 | 10/1975 | Crane et al. .................. 73/862.04 X |
| 4,372,157 | 2/1983 | Caruthers et al. . |
| 4,435,695 | 3/1984 | Maris . |
| 4,461,178 | 7/1984 | Chamuel . |
| 4,516,747 | 5/1985 | Lurz . |
| 4,545,553 | 10/1985 | Finke et al. . |
| 4,553,137 | 11/1985 | Marxer et al. . |
| 4,568,922 | 2/1986 | Schwippert et al. . |
| 4,570,881 | 2/1986 | Lustenberger . |
| 4,592,229 | 6/1986 | Butefisch et al. . |
| 4,604,612 | 8/1986 | Watkins et al. . |
| 4,611,492 | 9/1986 | Koosmann . |
| 4,631,958 | 12/1986 | Cauwenberghe et al. ........... 73/189 |
| 4,631,959 | 12/1986 | Motycka ............................... 73/189 |
| 4,688,421 | 8/1987 | Pzsolla . |
| 4,690,353 | 9/1987 | Haslim et al. . |
| 4,730,485 | 3/1988 | Franklin et al. ................... 73/170 R |
| 4,732,351 | 3/1988 | Bird . |
| 4,766,369 | 8/1988 | Weinstein . |
| 4,775,118 | 10/1988 | Daniels . |
| 4,786,020 | 11/1988 | Franke et al. . |
| 4,788,869 | 12/1988 | Li ...................................... 73/189 X |
| 4,802,642 | 2/1989 | Mangiarotty . |
| 4,891,628 | 1/1990 | Zuckerman . |

FOREIGN PATENT DOCUMENTS 883836 11/1981 U.S.S.R. .
1012143 4/1983 U.S.S.R. ............................. 73/189

OTHER PUBLICATIONS

Olsson et al., "Assessment of the Piezo-Electric Foil as a Mean of Monitoring the Wall Turbulence", *The Aeronautical Research Institute of Sweden* (FFA), Stockholm, Document No. FFATN 1985-60, 1985, pp. 1-30.

A. Berteirud, "Use of Hot film Sensors and Piezoelectric Foil for Measurement of Local Skin Friction", *The 12th International Congress on Instrumentation in Aerospace Simulation Facilites* (ICIASF), Williamsburg, Va., Jun. 22-25, 1987, pp. 1-5 (FIGS. 1-22).

W. B. Scott, "New Stall Detection System Measures Intensity of Turbulent Airflow Over Wing", *Aviation Week & Space Technology*, Jan. 11, 1988, pp. 57-59.

(List continued on next page.)

Primary Examiner—Charles A. Ruehl
Attorney, Agent, or Firm—Pennie & Edmonds

[57] ABSTRACT

A method and apparatus are disclosed for detecting the nature of fluid flow. Specifically, an omnidirectional aerodynamic sensor is disclosed comprising an omnidirectional aerodynamic drag force inducing probe, a force transducer and a signal processor. The force transducer is illustratively an array of strain gauges which detect forces in each of three orthogonal directions. Such forces are initially detected by the probe and then transmitted to the transducer. The transducer outputs electrical signals which the signal processor processes in order to determine, for example, aircraft angle-of-attack and angle-of-sideslip as well as wind speed and direction. The invention is especially useful in the field of aviation.

43 Claims, 8 Drawing Sheets

OTHER PUBLICATIONS

Dessurreault et al, "Design of a Tri-Axial Thrust Anemometer . . . ", *Ocean Engng.*, vol. 7, No. 4, (1980), pp. 521–537.

Donelan et al, "Miniature drag sphere velocity probe" *Rev. Sci. Instrum.* 49(3), Mar. 1978, pp. 298–304.

W. B. Scott "Air Force Funding Joint Studies to Develop 'Smart Skin' Avionics", *Aviation Week & Space Technology*, Apr. 18, 1988, p. 65.

Wusk et al. "An Arrayed Hot-Film Sensor for Detection of Laminar Boundary-Layer Flow Disturbance Spatial Characteristics", *AIAA/NASA/AFWAL Sensors & Measurement Technologies Conference*, Atlanta, Ga., Sep. 1–9, 1988, pp. 1–11.

J. S. Heyman and R. S. Rogowski "Fiber Optic Sensor Technology-An Opportunity for Smart Aerospace Structures", *AIAA/NASA/AFWAL Conference on Sensors and Measurements Techniques for Aeronautical Applications*, Atlanta, Ga., Sep. 7–9, 1988, pp. 1–5.

Regowski et al. "The Evolution of 'Smart' Composite Material", *NASA Tech. Briefs*, Oct., 1988, pp. 20–22.

Goldberg and Lardiere, Jr., "Developments in Expulsive Separation Ice Protection Blankets", *AIAA, 27th Aerospace Sciences Meeting*, Reno, Nev., Jan. 9–12, 1989, pp. 1–5.

Eric H. Urruti and John F. Wahl "Coatings Affect Fiber Performance in Smart-Skin Sensing", *Laser Focus World*, Jan. 1990, pp. 165–170.

Kovattana, "Triaxial Force Sensor", Proceedings of the 1982 Carnahan Conference on Security Technology, May 1982, pp. 71–79.

Dessureault et al, "The Design of a Thrust Anemometer for Drifting Buoy", Ocean 81 Conference Record (IEEE), Sep. 1981, pp. 411–414.

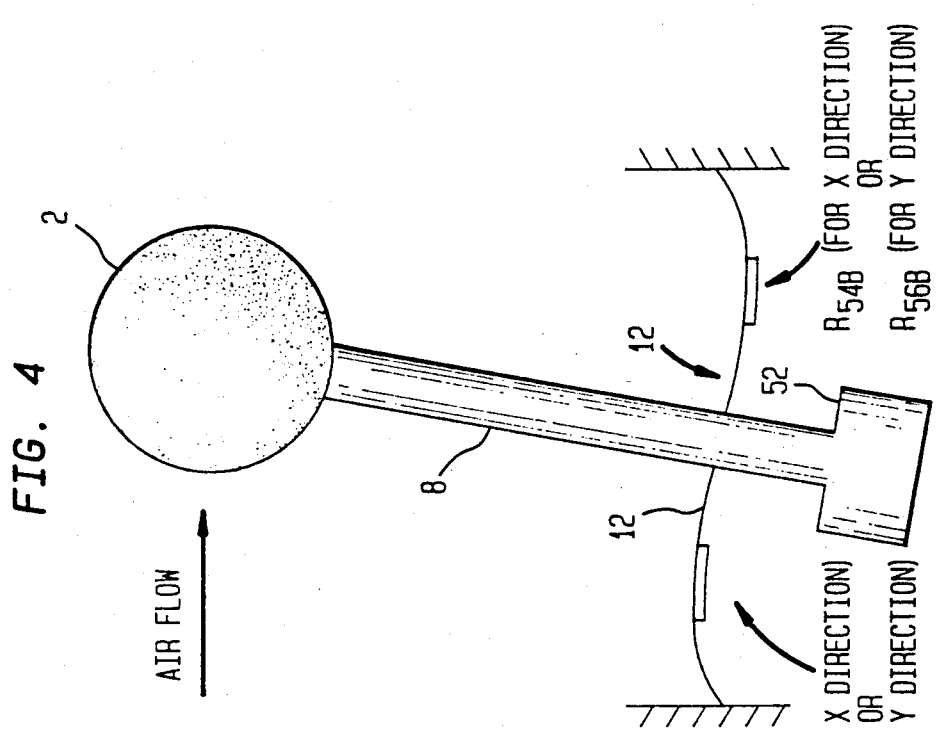
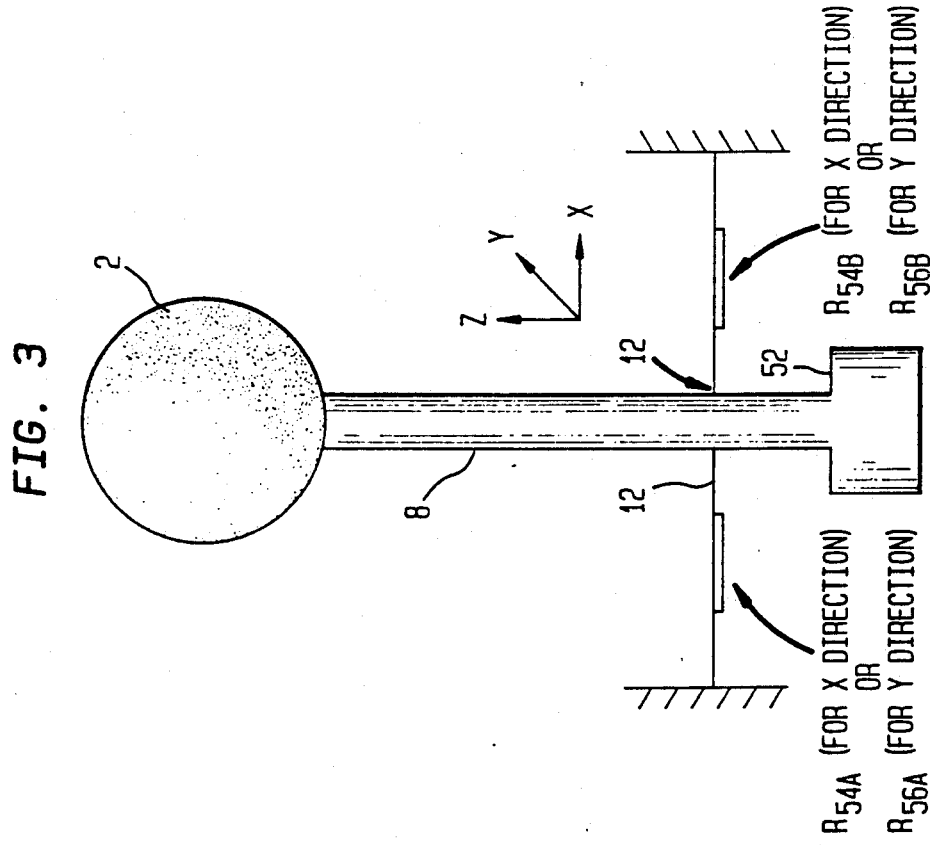

RESISTIVE STRAIN GAGE PLACEMENT AND WIRING FOR X DIRECTION SENSOR (54)

WHEATSTONE BRIDGE X DIRECTION SENSOR (54)

WHEATSTONE BRIDGE Y DIRECTION SENSOR (56)

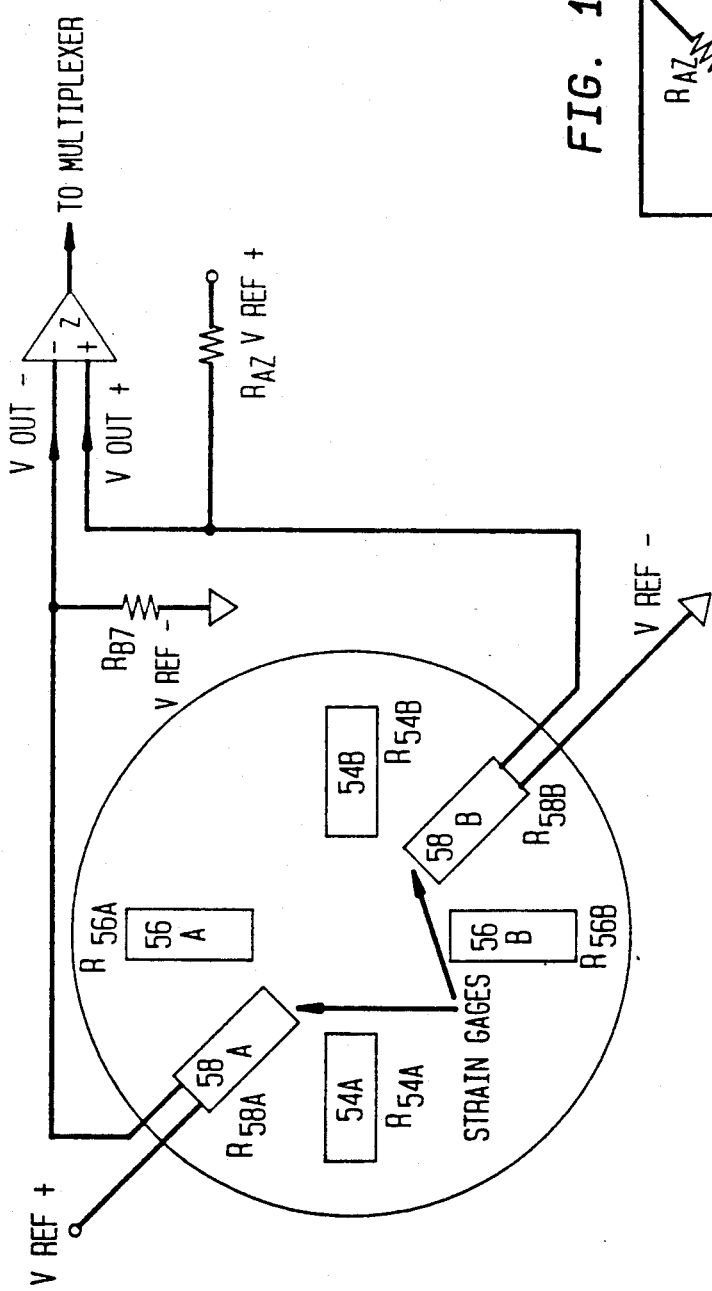
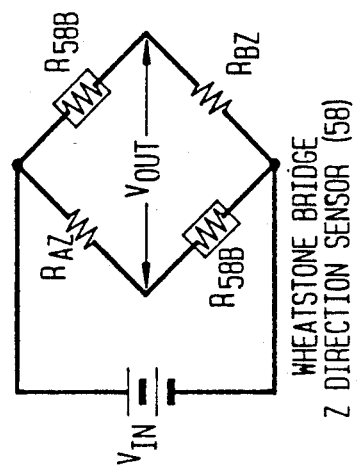
FIG. 11
RESISTIVE STRAIN GAGE PLACEMENT AND WIRING FOR Z DIRECTION SENSOR (58)
FIG. 12
WHEATSTONE BRIDGE Z DIRECTION SENSOR (58)

SPHERE DRAG COEFFICIENT

OMNIDIRECTIONAL AERODYNAMIC SENSOR

BACKGROUND OF THE INVENTION

This invention relates generally to the measurement of wind direction and speed, and to the omnidirectional measurement of aerodynamic drag forces, and more particularly to solid state electronic measurement devices for use in aircraft in determining real-time relative air velocity, angle-of-sideslip, and angle-of-attack.

Conventional flow sensors such as flow probes are employed to measure fluid flow. However, such conventional sensors suffer from not being able to accurately measure fluid flow which varies widely in magnitude as well as direction, e.g., reversal of fluid flow direction. In many situations, such as aircraft stall and jet engine compressor surge, changes in flow direction take place very rapidly thereby compounding the difficulty in accurately determining fluid flow. Knowledge of fluid flow magnitude and direction is especially important in developmental aerodynamics which require a reliable in-flight flow measurement device for high angle-of-attack and stall/spin research.

Reliable ground-based and/or in-flight airflow speed, i.e., magnitude, and direction detection is also important in military and civilian aviation, military and civilian marine operations and activities, military and civilian weather stations, automotive research development, military and civilian in-flight monitoring, military field applications, and home and educational activities. For example, air bases, airports, ships and harbor control can all benefit from improved fluid flow measurement methods and devices.

Conventional wind direction and speed sensors range in complexity from the traditional wind sock which flies over many civilian and military airports to much more elaborate sensors based on nuclear, laser or sonic technology. Each of these methods has certain advantages and disadvantages in terms of cost and performance. For example, the wind sock, although it can provide valuable information, is often difficult to spot by an incoming pilot. Spinning-cup/propeller anemometers and hot-wire anemometers are life-limited due to inherently fragile components. More elaborate sensors such as the laser, sonic and nuclear anemometers are prohibitively expensive for many applications.

In additional to inadequately measuring airflow speed and direction, conventional flow sensors are not cost effective for many applications. For example, conventional flow sensors do not cost effectively operate under icing conditions, or in non-clean environments such as when exposed to dirt, insects and rain. Such sensors have also been found to perform less than adequately at airflow speeds in the range of approximately Mach 0.1 to Mach 0.8, at high altitudes such as 10 kilometers, with a suitable directional accuracy such as ±1° for in-flight angle-of-attack (AOA) and angle-of-sideslip (AOS) monitoring, and/or in low wind speed ranges such as 5-100 knots with suitable accuracies such as an airflow accuracy of ±2 knots and an angular directional accuracy of ±2° in all possible directions.

SUMMARY OF THE INVENTION

In accordance with the present invention, a method and apparatus are provided for sensing airflow speed and direction. The apparatus comprises means for directly detecting aerodynamic forces, means for transducing such forces into electrical signals and a signal processor for computing and displaying in real-time airflow speed, i.e., magnitude, and direction. Preferably, such aerodynamic forces are detected, transduced and displayed in three dimensions.

Illustratively, the means for directly detecting aerodynamic forces comprises a spherical element which responds in a well-defined manner to the aerodynamic drag forces exerted upon it by airflow. Illustratively, the means for transducing the forces detected by the spherical element comprises an xyz sensing element. The xyz sensing element preferably is a two-dimensional array of resistive strain gauges mounted on one side of a semi-rigid diaphragm and configured so as to detect and differentiate forces in three orthogonal directions. Preferably, the spherical element is physically coupled to the xyz sensing element by a connecting member upon which the airflow has a relatively insignificant effect. The connecting member may be a cantilever beam or any other suitable structure. The xyz sensing element may be mounted on the diaphragm or, alternatively, on the connecting member in which case a rigid mount or disc may take the place of the diaphragm. Illustratively, the signal processor is a microprocessor. The microprocessor preferably receives output signals from one or more sensors indicative of environmental parameters such as temperature and pressure. The microprocessor is also provided with signals output by the strain gauges of the strain gauge array. The microprocessor employs stored data to compute airflow speed and direction. Advantageously, such airflow speed and direction may be computed for airflow in all possible directions. The stored data preferably comprises data tables and/or equations representing such tables. Such stored data includes information relating to the known response of an element to aerodynamic forces. The microprocessor processes the signals output by the strain gauge array and employs the temperature and pressure signals to provide temperature and pressure compensated three-dimensional airflow magnitude and direction information in real time. The signal processor may be provided with the various signals directly via a hardwire hookup or, alternatively, by telemetry. Advantageously, deicing control is incorporated into the preferred embodiment by the inclusion of a heater element.

The sensors in accordance with the invention overcome the disadvantages of conventional airflow measurement devices by providing omnidirectional airflow sensing coupled with real-time analysis capabilities. Advantageously, the sensors of the invention are reliable, solid-state, and inexpensive to fabricate and manufacture. The sensors are also capable of operating under icing conditions, in non-clean environments (i.e. dirt, insects, rain), in the Mach 0.1 to Mach 0.8 range, at an altitude of up to at least 10 kilometers, with a directional accuracy of ±1° for in-flight angle-of-attack and angle-of-sideslip monitoring, and/or in the 5-100 knot wind speed range with an airflow accuracy of ±2 knots and an angular directional accuracy of ±2° in all possible directions.

BRIEF DESCRIPTION OF THE DRAWINGS

These and other objects, features and advantages of the present invention will become more readily apparent from the following detailed description of the invention in which like elements are labelled similarly and in which:

FIGS. 3-6 are schematic drawings depicting the action of aerodynamic forces on the three-dimensional airflow sensor of FIG. 2;

FIG. 11 is a schematic drawing of three sets of strain gauges for use as x, y, and z directional arrays used in the three-dimensional airflow magnitude and direction sensor;

FIG. 12 is a schematic drawing of the z sensor of FIG. 11 configured in a Wheatstone bridge.

DETAILED DESCRIPTION OF THE DRAWINGS

Figure 1:
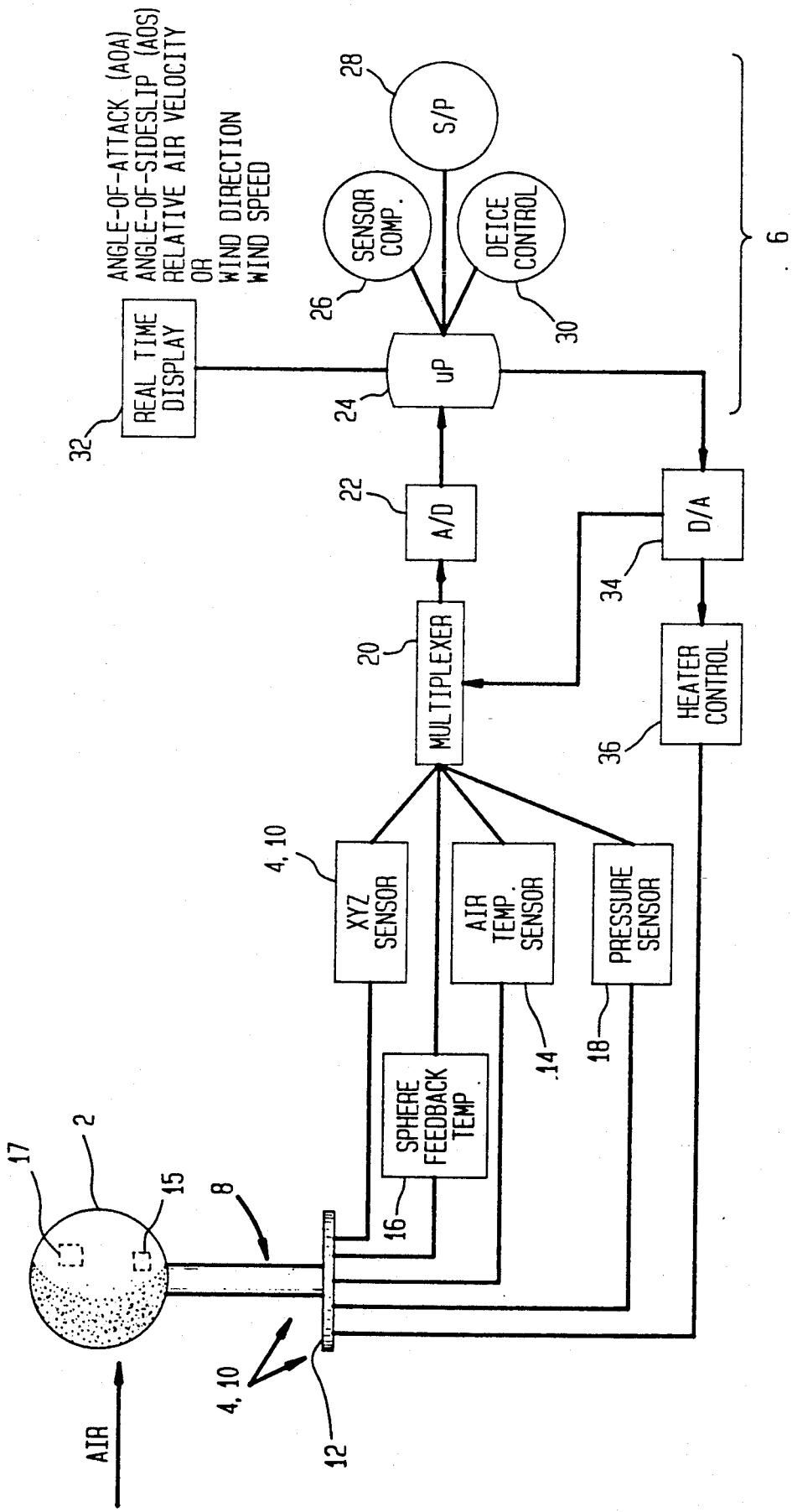
FIG. 1 is a functional block diagram of a preferred embodiment of the invention.

FIG. 1 is a functional diagram of a preferred embodiment of the invention comprising means such as an omnidirectional probe or body 2 for generating drag forces, a force transducer 4 and a signal processor 6.

Omnidirectional probe 2 is preferably in the form of a smooth sphere although other shapes may be employed as may probes having a roughened surface. Force transducer 4 detects forces such as aerodynamic forces preferably in each of three orthogonal directions and is connected to probe 2 by a support tube 8 having a diameter substantially less than that of the probe. Probe 2 and tube 8 may be constructed from any sufficiently rigid material and are preferably constructed from a lightweight rigid material such as lightweight stainless steel, which advantageously is compatible with the use of a heater for deicing. If intended for use in non-icing conditions, a composite material is equally suitable for probe 2 and tube 8. As will be appreciated by one skilled in the art, a roughened surface on spherical probe 2 provides forced turbulent airflow over the probe surface at desired Reynolds numbers. Although forced turbulent airflow is not required for proper operation of the invention, forced turbulent airflow minimizes the aerodynamic effects of accretion in non-clean environments such as that due to dirt, insects, rain, etc. Forced turbulent airflow is advantageous provided that the aerodynamic drag coefficient is maintained at a constant value over a sufficiently wide range of Reynolds numbers or air speed range of interest, as will be discussed in conjunction with FIG. 13.

Aerodynamic forces, such as drag forces, are applied to the probe and detected by the force transducer. Such forces are mechanically transmitted along support tube 8 to aerodynamic force transducer 4. Aerodynamic force transducer 4 is responsive to forces applied thereto and illustratively comprises a transducer array 10 and a semi-rigid diaphragm 12 (See FIGS. 1, 2). The edge of semi-rigid diaphragm 12 is preferably positionally fixed by attachment to a mounting structure (not shown). Transducer array 10 is firmly affixed to diaphragm 12. Array 10 detects tensile and compressive strains on diaphragm 12 due to aerodynamic drag forces which cause displacement of spherical probe 2 in the x, y and/or z directions. In the preferred embodiment, transducer array 10 comprises resistive strain gauges which are mounted on an underside of diaphragm 12 such that they output electrical signals indicative of the magnitude and direction of forces applied to probe 2. Such underside is advantageously protected from the elements of the environment, i.e., rain, debris, etc. Alternatively, the force transducer may be mounted on support tube 8, in which case diaphragm 12 is not necessary and a rigid mount may be employed. Suitable resistance strain gauges are LY series bonded resistive strain gauges which are available from Omega Engineering, Inc., of P.O. Box 4047, Stamford, Conn. 26909.

Figure 2:
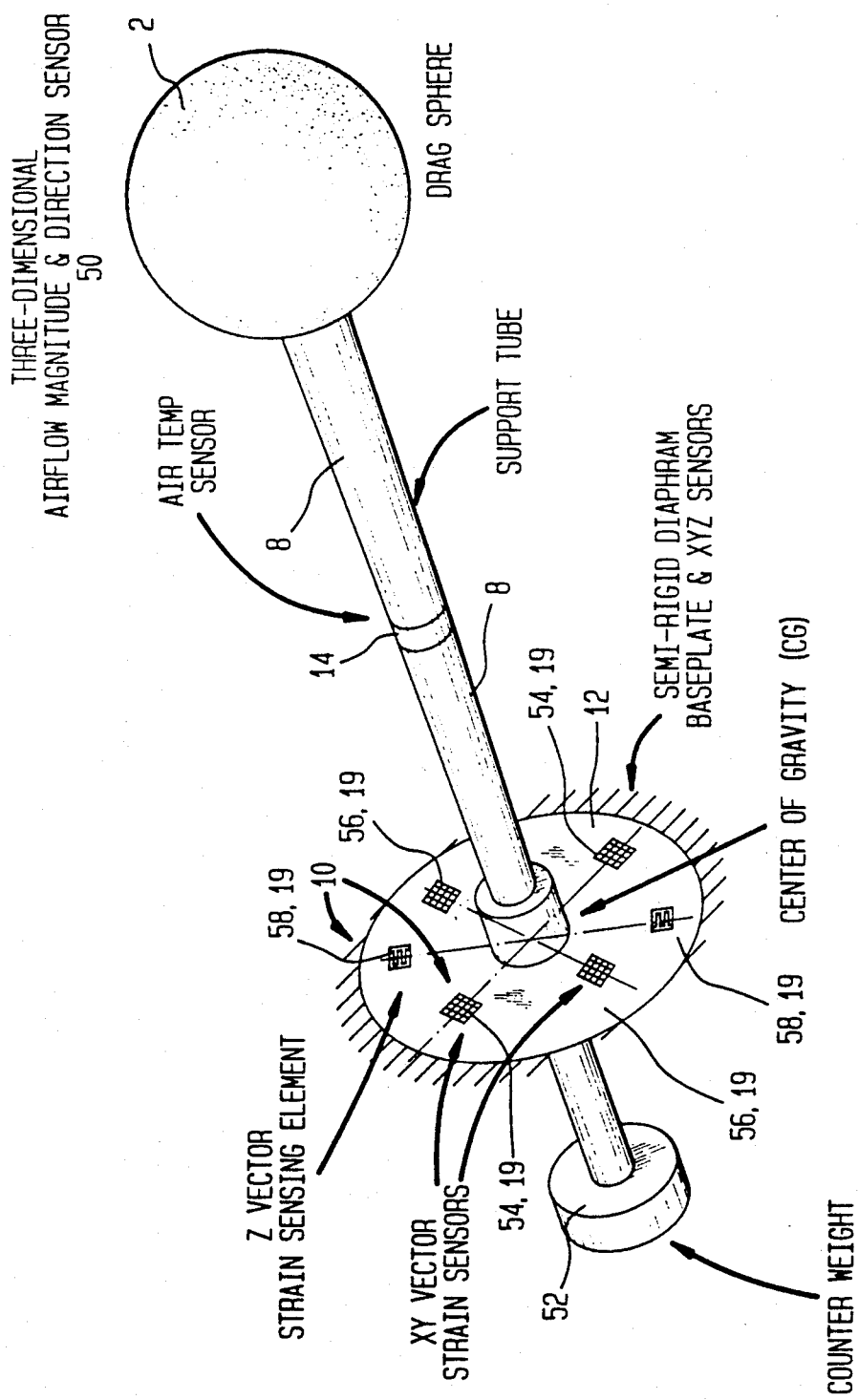
FIG. 2 is a schematic drawing of a preferred three-dimensional airflow magnitude and direction sensor.

Preferably, an air temperature sensor 14, a sphere temperature sensor 16 for de-icing control and a pressure sensor 18 are attached to support tube 8 or probe 2 (see FIGS. 1, 2). Outputs from each of the strain gauges in transducer array 10, air-stream temperature sensor 14, sphere temperature sensor 16 and pressure sensor 18 are fed into a multiplexor 20, then digitized by an analog-to-digital (A/D) converter 22 and input to signal processor 6. Signal processor 6 preferably includes a microprocessor 24 which incorporates sensor pressure and temperature compensation software 26, signal processing software 28 and de-icing control software 30. Software 26, 28 and 30 utilizes stored data and formulae to compute temperature and pressure compensated airflow speed and direction in all possible directions as well as to control probe de-icing Software 26, 28 and 30 preferably includes equations 1-9 described herein for calculating airflow speed and direction as well as angle-of-attack and angle-of-sideslip. Temperature sensors 14, 16 are preferably thermistor or platinum sensors while pressure sensor 18 is preferably a thin film aneroid. Computed information such as angle-of-attack and angle-of-sideslip, and/or wind speed and direction is displayed in real time on display means 32. Such information may also be made available as analog or digital signal outputs which are proportional to the computed information. Sphere temperature sensor 16 is preferably attached to the internal surface of the sphere so as to monitor sphere surface temperature. A heater element 15 is preferably located within the sphere to maintain the sphere ice-free under conditions of maximum anticipated air velocity at coldest anticipated air temperature. Such heater element preferably comprises nichrome wire. Digital microprocessor signals are converted to analog equivalents by a digital-to-analog converter (D/A) 34 to activate a sphere heating controller 36 which controls the heater element. Alternatively, sonic, ultrasonic or any other suitable vibrating means 17 may be employed to physically expel ice or other obstructions from the sphere or support tube. Vibrating means 17 may be located within sphere 2.

Specifically, FIG. 2 illustrates a preferred embodiment of a three-dimensional airflow magnitude and direction sensor 50. Sensor 50 comprises roughened spherical probe 2, support tube 8, semi-rigid diaphragm 12, counterweight 52, x-sensor 54, y-sensor 56 and z-sensor 58. Flow transition errors caused by dirt, insect, or ice buildup on the surface of sphere 2 are minimized by employing a sphere having a roughened surface. As will be appreciated by one skilled in the art, roughening serves to render the airflow over the surface of the sphere more turbulent. Additionally, the sphere size is selected so that the drag force coefficient is constant over the Reynolds numbers or air speed range of interest.

In accordance with the principles of the invention, aerodynamic forces such as drag forces act on sphere 2 and are translated by support tube 8 into a bending force acting on semi-rigid diaphragm 12. Strain sensing elements preferably mounted on the protected underside of the diaphragm in the x direction (sensor set 54 comprising elements 54A and 54B), y direction (sensor set 56 comprising elements 56A and 56B) and z direction (sensor set 58 comprising elements 58A and 58B) detect compressive and tensile strains on the surface of the diaphragm. As more clearly depicted in FIGS. 3-6, each of sensors 54, 56 and 58 comprises two elements 54A, B, 56A, B and 58A, B, preferably located 180° apart from each other. Output from each set of strain sensors 54, 56 and 58 is provided to a signal processor (not shown). The output signal may alternatively be transmitted to the signal processor by telemetry means 19, such as a transmitter associated with sensors 54, 56, and 58. Counter weight 52 serves to locate the center of gravity of sensor 50 at the center of diaphragm 12. As will be appreciated by one skilled in the art, the inclusion of a counter weight reduces errors due to inertia during acceleration of an aircraft. The free air stream temperature is monitored by a temperature sensor such as a thermistor or platinum resistance thermometer 14 attached to a metal ring mounted on a thermal standoff on support tube 8. Ambient pressure is monitored by the inclusion of a thin-film aneroid pressure-sensing element 18 (see FIG. 1). Such a pressure sensing element, as well as temperature sensors 14, 16, are conventional in design and further details are not necessary for a proper understanding of this invention.

As will be appreciated by one skilled in the art, probe 2 should be maintained in an ice-free state to prevent unpredictable variability in the probe's response to aerodynamic forces. More specifically, such an ice-free state is desirable since it facilitates maintaining the drag force coefficient constant over a sufficiently wide range of Reynolds numbers or air speed range of interest, as will be discussed in conjunction with FIG. 13. Therefore, temperature sensor 16 (see FIG. 1) is preferably included within the sphere of the preferred embodiment to measure the sphere surface temperature. This sensor is part of a heater control circuit which maintains the sphere surface above the freezing temperature.

The principle of operation of the three-dimensional force sensor or transducer of the preferred embodiment 50 is illustrated in FIGS. 3-6. Aerodynamic forces in the x or y direction (see FIGS. 3-4) impinge on sphere 2 and are conveyed by support tube 8 into a bending force on semi-rigid diaphragm 12. Two pairs of resistive strain gauges are firmly affixed to the diaphragm surface to detect flexion as tensile or compressive strain and are used to detect forces in the x and y directions. One pair (54A, 54B) comprises gauges sensitive to force in the x direction; a second pair (56A, 56B), oriented orthogonally to the first pair, comprises gauges sensitive to force in the y direction.

Figure 6:
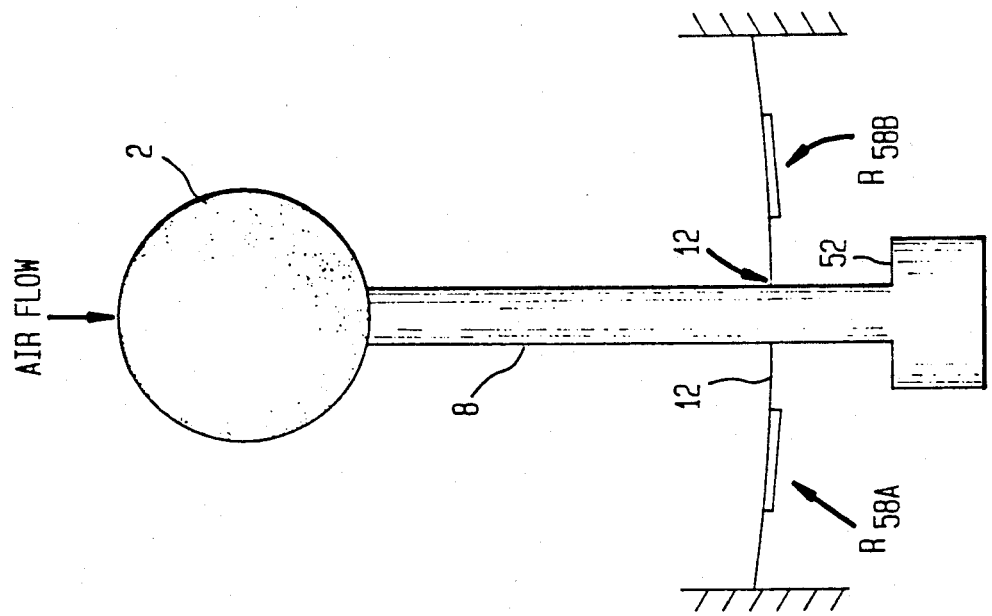
Figure 5:
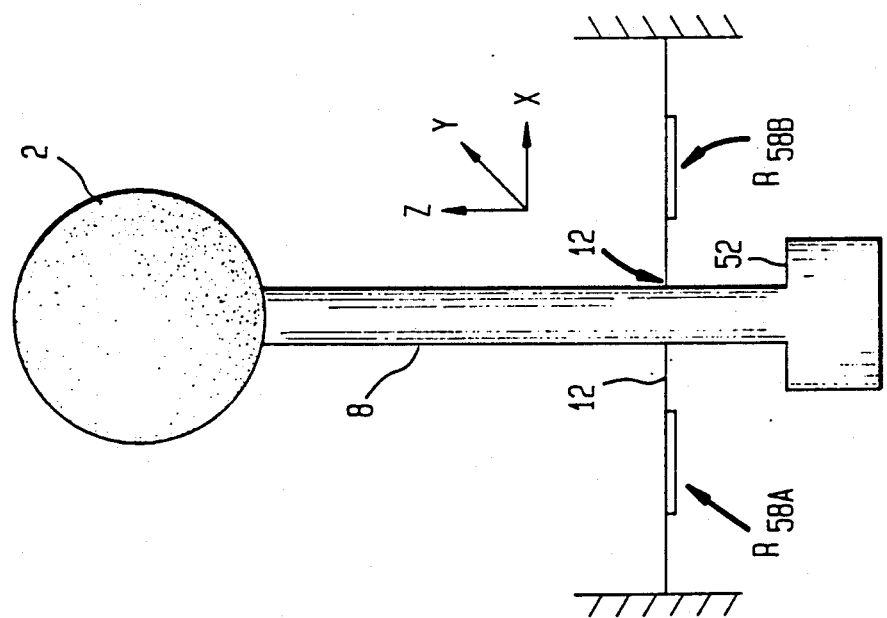
Figure 7:
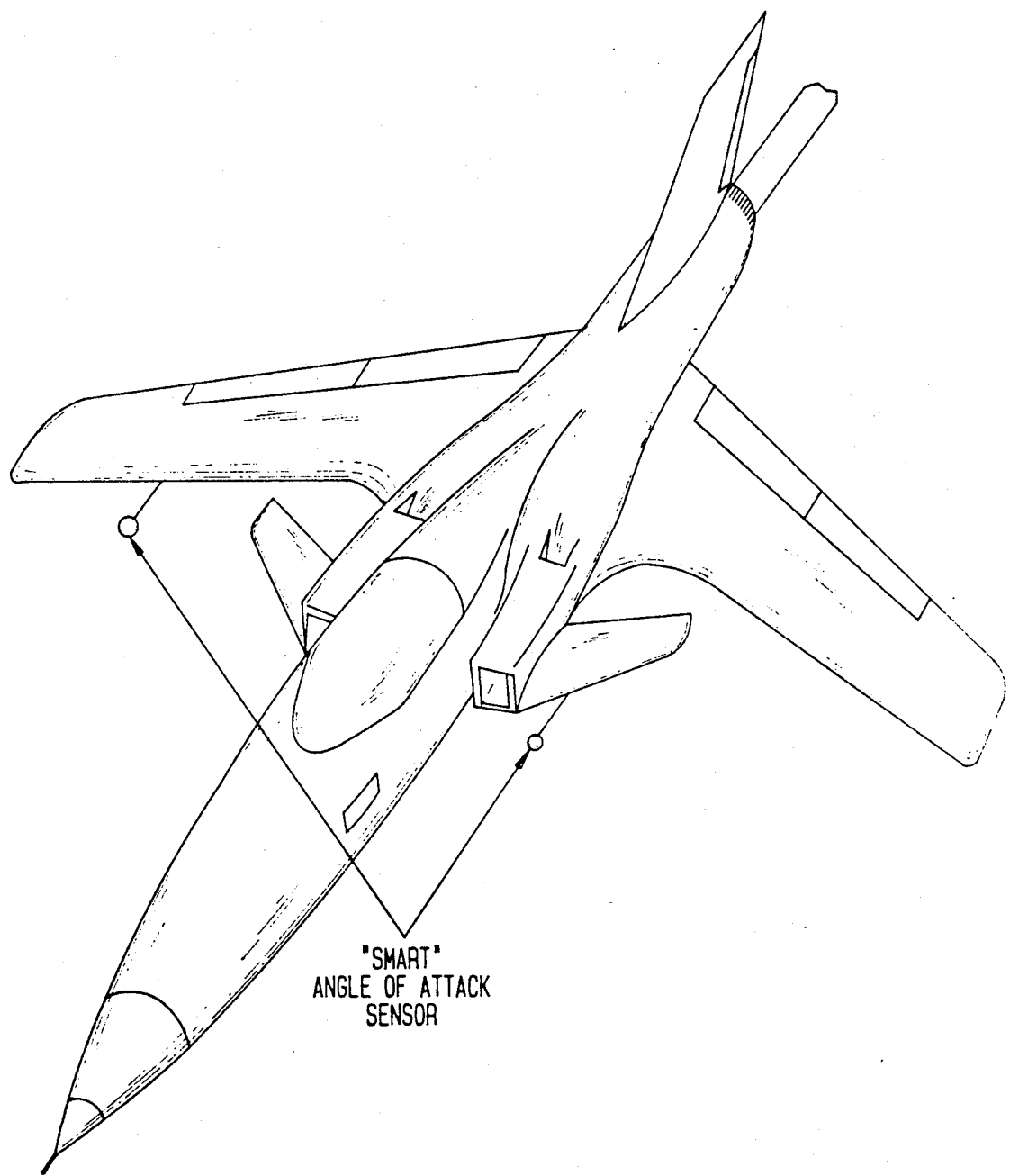
FIG. 7 depicts illustrative placement of the preferred airflow direction and magnitude sensor on a representative aircraft to detect angle-of-attack and angle-of-sideslip.
Figure 8:
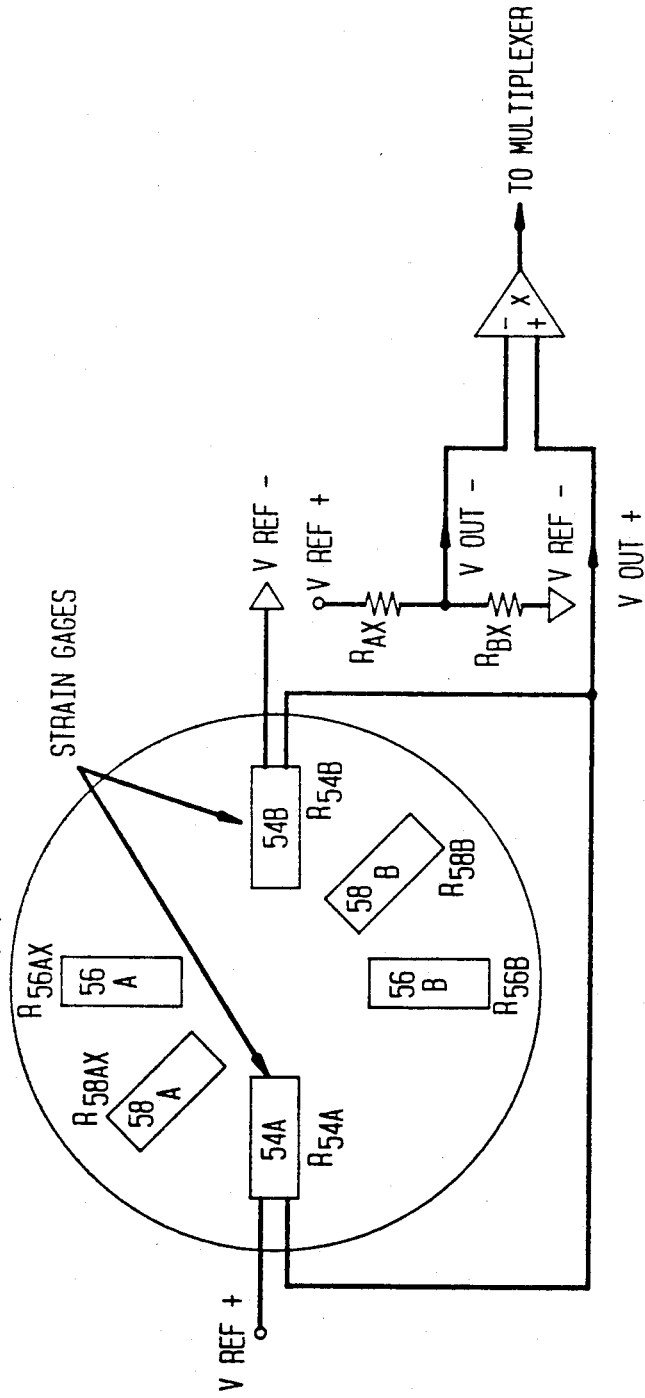
FIG. 8 is a schematic drawings of three sets of strain gauges for use as x, y, and z directional arrays used in the three-dimensional airflow magnitude and direction sensor.
Figure 9:
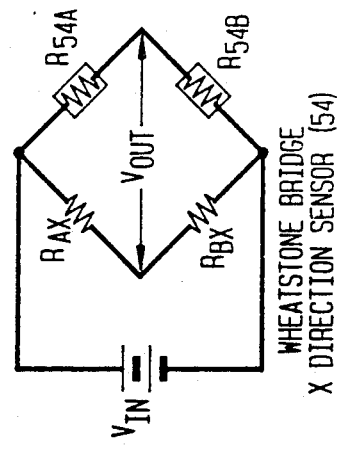
FIGS. 9 and 10 are schematic drawings of the x and y sensors of FIG. 8 configured in Wheatstone bridges.
Figure 10:
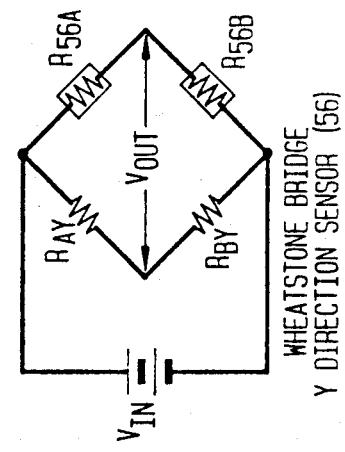

FIGS. 5-6 show the effects of the impingement of aerodynamic forces in the z direction on sphere 2. One pair of resistive strain gauges (58A, 58B) is firmly affixed to the diaphragm and positioned to detect forces in the z direction. A standard Wheatstone bridge arrangement is used for each directional set of two resistive strain gauges. This arrangement intensifies the output signal and compensates for temperature variations, as will be discussed in conjunction with FIGS. 8-12. More specifically, and as depicted in FIGS. 3, 4, an aerodynamic force applied to sphere 2 in the x-y plane is translated by support tube 8 into tensile strain on the surface of diaphragm 12 on one side of the support tube and compressive strain on the same surface located 180° from the tensile strain. The support tube similarly translates force in the z direction (see FIGS. 5, 6) into a bending force on diaphragm 12 which produces a compressive (or tensile) strain on the surface of the diaphragm and a like strain on the same surface at 180°. Such strains are detected by strain gauges 58A, 58B which detect force in the z direction. Alternatively, by suitably processing signals output by sensors 54, 56, force in the z direction can be detected and its magnitude determined without the need for separate z direction sensors 58. For example, if all strain gauges on the internal surface of diaphragm 12 experience equal tensile strain, a force purely in the negative z direction exists.

The inclusion of counter weight 52 reduces errors due to inertial force in the x-y plane to insignificancy. In addition, the weight of the device and support tube moment are preferably minimized so that errors due to acceleration in the z direction are greatly reduced and can be assumed insignificant.

Alternate configurations of resistive strain gauge arrays, or other types of strain transducers may be used to determine compressive and tensile strains in other embodiments. The resistance strain gauge array is chosen for the preferred embodiment as relatively simple and inexpensive. Additionally, the calibration characteristic is relatively linear. Such a strain gauge array provides for an analog voltage output proportional to the moment and axial force produced by the sphere drag force.

FIGS. 8-12 depict one embodiment of Wheatstone bridges for x, y and z direction force measuring circuits for use in accurately determining strain in accordance with the invention. The angular deflection of the support tube and flexure are preferably very small. To accurately measure the minute strains generated, the system must be capable of detecting minute resistance changes output by the strain gauges. In the preferred embodiment, the sensitivity of the system is enhanced by the use of a standard Wheatstone bridge. Two resistive strain gauges and two fixed or unstrained resistors are used to measure aerodynamic forces in each of three orthogonal directions. One pair of strain gauges located 180° apart on the same surface of the diaphragm defines each of the x (gauges 54A, 54B) and y (gauges 56A, 56B) axes (see FIGS. 8-10). To measure force in the z direction, paired gauges (58A, 58B) are wired as depicted in FIGS. 11-12. Total strain for each of the three orthogonal directions is given by the equations:

$$\epsilon Tx = \epsilon RAx - \epsilon RBx + \epsilon R54B - \epsilon R54A \quad (1a)$$

$$\epsilon Ty = \epsilon RAy - \epsilon RBy + \epsilon R56B - \epsilon R56A \quad (1b)$$

$$\epsilon Tz = \epsilon RAz - \epsilon RBz + \epsilon R58B - \epsilon R58A \quad (1c)$$

where:
$\epsilon Tx$ = Total strain in the x direction
$\epsilon Ty$ = Total strain in the y direction
$\epsilon Tz$ = Total strain in the z direction
$\epsilon RAx$ = Strain on resistor "Ax" in the x direction εRAy = Strain on resistor "Ay" in the y direction
εRAz = Strain on resistor "Az" in the z direction
εRBx = Strain on resistor "Bx" in the x direction
εRBy = Strain on resistor "By" in the y direction
εRBz = Strain on resistor "Bz" in the z direction
εR54B = Strain on element 54B in the x direction
εR56B = Strain on element 56B in the y direction
εR58B = Strain on element 58B in the z direction
εR54A = Strain on element 54A in the x direction
εR56A = Strain on element 56A in the y direction
εR58A = Strain on element 58A in the z direction
and resistors Ax, Ay, Az, Bx, By, Bz are fixed resistors or unstrained resistance strain gauges.

In this Wheatstone bridge arrangement, temperature equally affects all strain gauges and fixed resistors of each set. Since the absolute values of the positive and negative resistances are added, the design automatically compensates for temperature effects.

The aerodynamic drag force $F_D$, on the sphere and support tube is computed from the following equations:

$$F_D = C_D \cdot Q \cdot A \qquad (2)$$

$$Q = \tfrac{1}{2} \Phi \cdot V^2 \qquad (3)$$

where:
$C_D$ = drag coefficient of the sphere and support tube (dimensionless)
$Q$ = dynamic pressure (N/m²)
$A$ = projected cross-sectional area of sphere and support tube (m²)
$\Phi$ = air density (Kg/m²)
$V$ = flow speed (m/sec)

Figure 13:
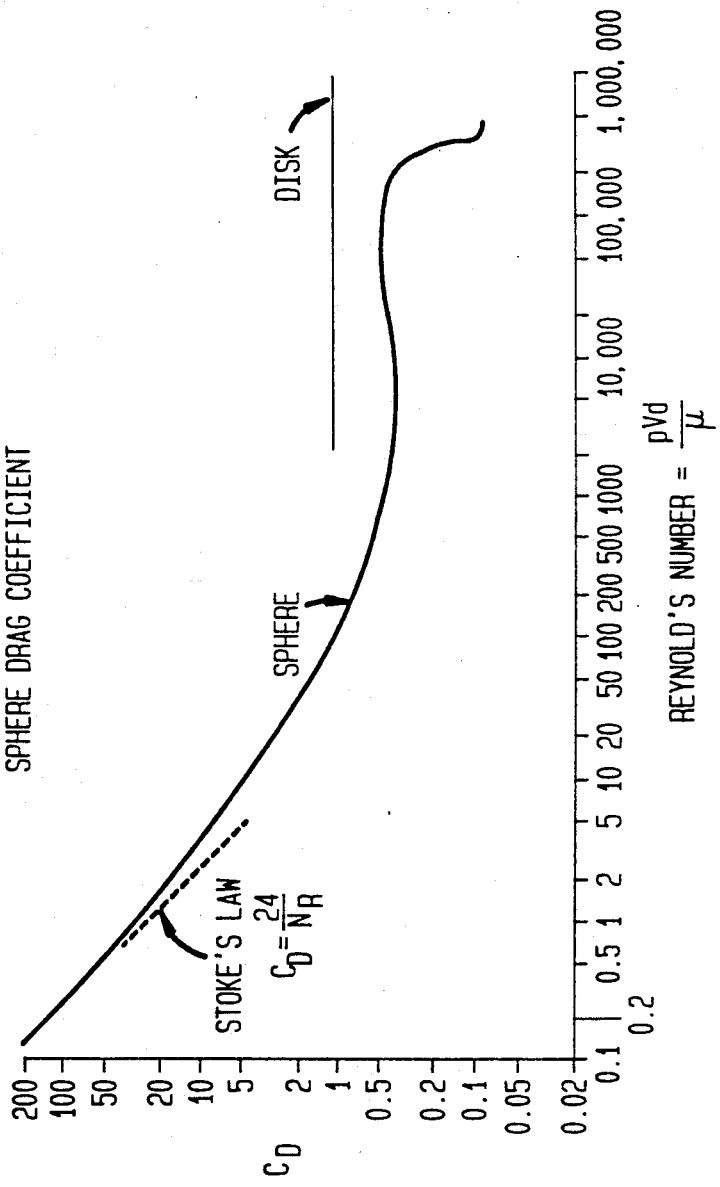
FIG. 13 graphically depicts the drag coefficient for both a sphere and a disk.

For purposes of this analysis, equation 2 will be without accounting for the drag force of the support tube. Thus the drag coefficient is that of a sphere, which is shown in FIG. 13 as a function of the Reynolds number, $R_E$.

The Reynolds number is given by the formula:

$$R_E = V \cdot D \cdot \Phi / \mu \qquad (4)$$

where:
D = diameter of the sphere (m)
μ = viscosity of the air (Kg/(m sec))

For the purpose of this analysis it is assumed that the sphere is less than one inch in diameter such that typical maximum $R_E$s will be less than 150,000 at the Mach 0.8 flight speed and 10 kilometer altitude representative of commercial jet aircraft cruise conditions.

From FIG. 13, it is seen that the drag created by the airflow over the sphere is a function of Reynolds number. It is also seen that the drag coefficient approaches a value of:

$$C_D = \tfrac{1}{2} \qquad (5)$$

over the relevant $R_E$ range from 500 to 200,000. As can be seen, the curve is relatively level or flat for this range. As will be appreciated by one skilled in the art, the aerodynamic drag sphere should be sized so that the $R_E$ falls within this range. Substituting equations 3 and 5 into equation 2 yields:

$$[V] = 2([F_D]/\Phi \cdot A)^{\tfrac{1}{2}} \qquad (6)$$

For present purposes, air density and sphere cross-sectional area are assumed to be constant over the relevant time period. The direction of flow is computed by the following formulae:

$$\Theta_\alpha = \tan^{-1}(V_z/V_x) = \tan^{-1}(F_{DZ}/F_{DX})^{\tfrac{1}{2}} \qquad (7)$$

$$\Theta_\beta = \tan^{-1}(V_y/V_x) = \tan^{-1}(F_{DY}/F_{DX})^{\tfrac{1}{2}} \qquad (8)$$

where:
$\Theta_\alpha$ = angle-of-attack, °
$\Theta_\beta$ = angle-of-sideslip, °
$V_x$ = flow speed in x-direction
$V_y$ = flow speed in y-direction
$V_z$ = flow speed in z-direction
$F_{DX}$ = drag force in x-direction
$F_{DY}$ = drag force in y-direction
$F_{DZ}$ = drag force in z-direction The flow velocity vector [V], as shown in equation 6, is, however, a function of air density. Air density can be computed by the following formula:

$$\Phi = P/(R \cdot T) \qquad (9)$$

where:
P = air static pressure (N/m²)
R = gas constant for air (288 J/(Kg °K))
T = air absolute temperature (°K)

Pressure sensors may be provided to increase resolution. Specifically, increased resolution may be provided by employing pressure sensors to accurately measure air density. Flow equation 6 includes $\Phi$, which is a function of air density. Since the flow temperature is generally measured in accordance with the invention, air density can be calculated according to equation 9 if pressure is also measured. In the preferred embodiment, provisions are made for this pressure measurement with a low cost solid-state pressure sensing IC chip serving as pressure sensor 18 (see FIG. 1).

The incorporation of a microprocessor into the system allows a significant increase in accuracy. Because of the actual non-constant relationship between $C_D$ and $R_E$ (see FIG. 13), the angle-of-attack/angle-of sideslip/wind-sensor system may use stored data to take these empirical non-linearities into account in determining the drag coefficient $C_D$. Since $R_E$ is itself a function of temperature and/or pressure dependent variables (namely, air viscosity = μ(T), and air density = $\Phi$(T,P)), a further increase in accuracy in determining $C_D$ is obtained. Accordingly, the measured temperature and pressure are employed to enable a more accurate determination of $C_D$, and therefore of [V], $\Theta_\alpha$, and $\Theta_\beta$ (see equations 2-9).

The preferred embodiment of the airflow sensor employs three output voltage signals from the strain gauges that are proportional to the sphere drag force components $F_{DX}$, $F_{DY}$, and $F_{DZ}$, as inputs to analog-to-digital converters and then to a digital microprocessor where the speed and direction vectors, as well as the angle-of-attack and angle-of-sideslip are computed from equations 6, 7 and 8.

The invention is not limited to the use of resistive strain gauges to detect a parameter dependent on aerodynamic drag forces applied to the surface of a probe. For example, piezoresistive sensors or distance displacement gauges such as optical displacement or rotation detection devices, proximity detectors, capacitive transducers, or Hall effect transducers may be used as force transducer 4 or transducer array 10. Each of these devices detects tensile and compressive forces in each of three orthogonal directions and outputs signals indicative of the magnitude of the aerodynamic forces exerted on the spherical probe in each of the three orthogonal directions. The signals from these devices may be connected to a multiplexor and digitized by an A/D converter and provided to a signal processor. Nor is the invention limited to the detection or transduction of aerodynamic drag forces by a spherical drag force transducer such as the probe described herein. As will be appreciated by one skilled in the art, the drag force probe may be of any defined geometric shape if the drag coefficient characteristics of that shape are known or empirically determined. Furthermore, for some meteorological applications where x and y direction wind speed are the only parameters of interest, non-spherical geometries are equally appropriate. It is further noted that for monitoring x-y wind speed and direction, strains may be measured orthogonally on the surface of the support tube. It is further noted that for stationary mounts where the probe is placed vertically, a counter weight is not necessary for proper operation.

It will be apparent to those skilled in the art that various modifications can be made in the system of the present invention without departing from the scope and spirit of the invention. Thus, it is intended that the present invention cover the variations and modifications of this invention provided they come within the scope of the appended claims and their equivalents.

What is claimed is:

1. An apparatus for determining speed and direction of airflow comprising:
    means for providing aerodynamic forces;
    means connected to said providing means for mechanically transmitting said aerodynamic forces exerted on said providing means;
    diaphragm means connected to said transmitting means for receiving and physically responding to said mechanically transmitted forces;
    means for sensing said physical response of said diaphragm means and for outputting electrical signals indicative of the magnitude and direction of said aerodynamic forces; and
    means for maintaining the center of gravity of said apparatus at the center of said diaphragm means.

2. The apparatus of claim 1 wherein said sensing means comprises a plurality of strain sensors configured to output signals indicative of the magnitude of said aerodynamic forces in each of three orthogonal directions.

3. The apparatus of claim 2 wherein said strain sensors are resistive strain gauges which detect tensile and compressive forces in each of said three orthogonal directions.

4. The apparatus of claim 1 wherein said sensing means comprises an array of piezoresistors which detect tensile and compressive forces in each of three orthogonal directions and which output signals indicative of the magnitude of said aerodynamic forces in each of said three orthogonal directions.

5. The apparatus of claim 1 wherein said sensing means comprises an array of proximity or displacement gauges which detect displacement due to tensile and compressive forces in each of three orthogonal directions and which output signals indicative of the magnitude of said aerodynamic forces in each of three orthogonal directions.

6. The apparatus of claim 5 wherein said displacement gauges are resistive displacement gauges.

7. The apparatus of claim 5 wherein said displacement gauges are capacitive displacement gauges.

8. The apparatus of claim 5 wherein said displacement gauges are optical displacement gauges.

9. The apparatus of claim 5 wherein said displacement gauges are rotation detection gauges.

10. The apparatus of claim 1 wherein said sensing means comprises an array of Hall effect transducers which detect displacement due to tensile and compressive forces in each of three orthogonal directions and which output signals indicative of the magnitude of said aerodynamic forces in each of said three orthogonal directions.

11. The apparatus of claim 1 wherein said providing means is a sphere.

12. The apparatus of claim 11 wherein said sphere has a roughened surface to control turbulent air flow.

13. The apparatus of claim 11 wherein said transmitting means is tubular and is small in cross-sectional area in relation to said sphere.

14. The apparatus of claim 1 further comprising telemetry means for transmitting said electrical signals.

15. The apparatus of claim 1 further comprising a Wheatstone bridge circuit coupled to said sensing means for improving the accuracy of said electrical signals which are indicative of the magnitude of said aerodynamic forces.

16. A method of determining relative airflow speed and direction, and aircraft angle-of-attack and angle-of-sideslip comprising the steps of:
    maintaining a surface of a geometric structure in the path of said airflow;
    sensing three-dimensional aerodynamic drag forces on said geometric structure;
    transducing said three-dimensional aerodynamic drag forces into electronic signals indicative of said drag forces;
    sensing ambient temperature and producing electrical signals relating thereto;
    sensing ambient pressure and producing electrical signals relating thereto; and
    analyzing said electronic signals, temperature signals, and pressure signals to determine relative air speed, direction, angle-of-attack and angle-of-sideslip.

17. The method of claim 16 wherein said electronic signals and said electrical signals are telemetered to signal processing means.

18. The method of claim 16 further comprising the step of maintaining said surface free of ice.

19. A method of determining the magnitude and direction of fluid flow comprising the steps of:
    maintaining a surface of a geometric structure in the path of said fluid flow;
    sensing forces on said geometric structure due to said fluid flow;
    transducing said forces into electronic signals;
    sensing ambient temperature and producing electrical signals relating thereto;
    sensing ambient pressure and producing electrical signals relating thereto; and
    analyzing said electronic signals, temperature signals, and pressure signals to determine relative air speed, direction, angle-of-attack and angle-of-sideslip.

20. The method of claim 19 wherein said electronic signals and said electrical signals are telemetered to signal processing means.

21. The method of claim 19 further comprising the step of maintaining said surface free of obstructions.

22. An apparatus for determining speed and direction of airflow comprising:
    means for providing aerodynamic forces;
    means connected to said providing means for mechanically transmitting said aerodynamic forces exerted on said providing means;
    diaphragm means connected to said transmitting means for receiving and physically responding to said mechanically transmitted forces;
    means for sensing said physical response of said diaphragm means and for outputting electrical signals indicative of the magnitude and direction of said aerodynamic forces;
    means for monitoring temperature of the ambient free air stream;
    means for monitoring ambient pressure;
    means for determining whether ice is present on said providing means; and
    means for maintaining the center of gravity of said apparatus at the center of said diaphragm means.

23. The apparatus of claim 22 further comprising signal processing means for calculating airflow speed and direction, said signal processing means being provided with input from said temperature monitoring means, said pressure monitoring means and said sensing means.

24. The apparatus of claim 23 wherein said signal processing means comprises a microprocessor and software.

25. The apparatus of claim 23 wherein the physical response of said diaphragm means which is sensed by said sensing means is a bending of said diaphragm means.

26. The apparatus of claim 25 wherein the aerodynamic drag coefficients of said providing means are known or can be empirically determined.

27. The apparatus of claim 22 further comprising means for maintaining said providing means free of ice.

28. The apparatus of claim 27 wherein said means for maintaining said providing means free of ice comprises a heater located within said providing means, driver electronics and a temperature sensor interior to a surface of said providing means, said temperature sensor generating a low-temperature signal when the temperature of said surface falls below a predetermined reference level.

29. The apparatus of claim 27 wherein said means for maintaining said providing means free of ice comprises vibrating means.

30. The apparatus of claim 22 wherein said temperature monitoring means comprises a thermistor.

31. The apparatus of claim 22 wherein said temperature monitoring means comprises a platinum resistance thermometer or thermocouple.

32. The apparatus of claim 22 wherein said pressure monitoring means comprises a thin-film aneroid.

33. The apparatus of claim 22 wherein said pressure monitoring means comprises a solid-state integrated circuit (IC) chip.

34. The apparatus of claim 22 wherein said maintaining means is a counter weight which maintains the center of gravity of said apparatus at a point of intersection between said diaphragm means and said transmitting means.

35. The apparatus of claim 22 wherein said sensing means comprises a plurality of strain sensors configured to output signals indicative of the magnitude of said aerodynamics forces in each of three orthogonal directions.

36. The apparatus of claim 35 wherein said strain sensors are resistive strain gauges which detect tensile and compressive fores in each of said three orthogonal directions.

37. The apparatus of claim 22 wherein said sensing means comprises an array of piezoresistors which detect tensile and compressive fores in each of three orthogonal directions and which output signals indicative of the magnitude of said aerodynamics forces in each of said three orthogonal directions.

38. The apparatus of claim 22 wherein said sensing means comprises an array of proximity detectors or displacement gauges which detect displacement due to tensile and compressive forces in each of three orthogonal directions and which output signals indicative of the magnitude of said aerodynamics forces in each of said three orthogonal directions.

39. The apparatus of claim 38 wherein said displacement gauges are resistive displacement gauges.

40. The apparatus of claim 38 wherein said displacement gauges are capacitive displacement gauges.

41. The apparatus of claim 38 wherein said displacement gauges are optical displacement gauges.

42. The apparatus of claim 38 wherein said displacement gauges are rotation detection gauges.

43. The apparatus of claim 22 wherein said sensing means comprises an array of Hall effect transducers which detect displacement due to tensile and compressive forces in each of three orthogonal directions and which output signals indicative of the magnitude of said aerodynamic forces in each of said three orthogonal directions.

* * * * *